March 10, 1931.  S. LARSON  1,795,340
FLOW INDICATOR FOR FLUIDS IN CLOSED CONDUITS
Filed Feb. 19, 1930
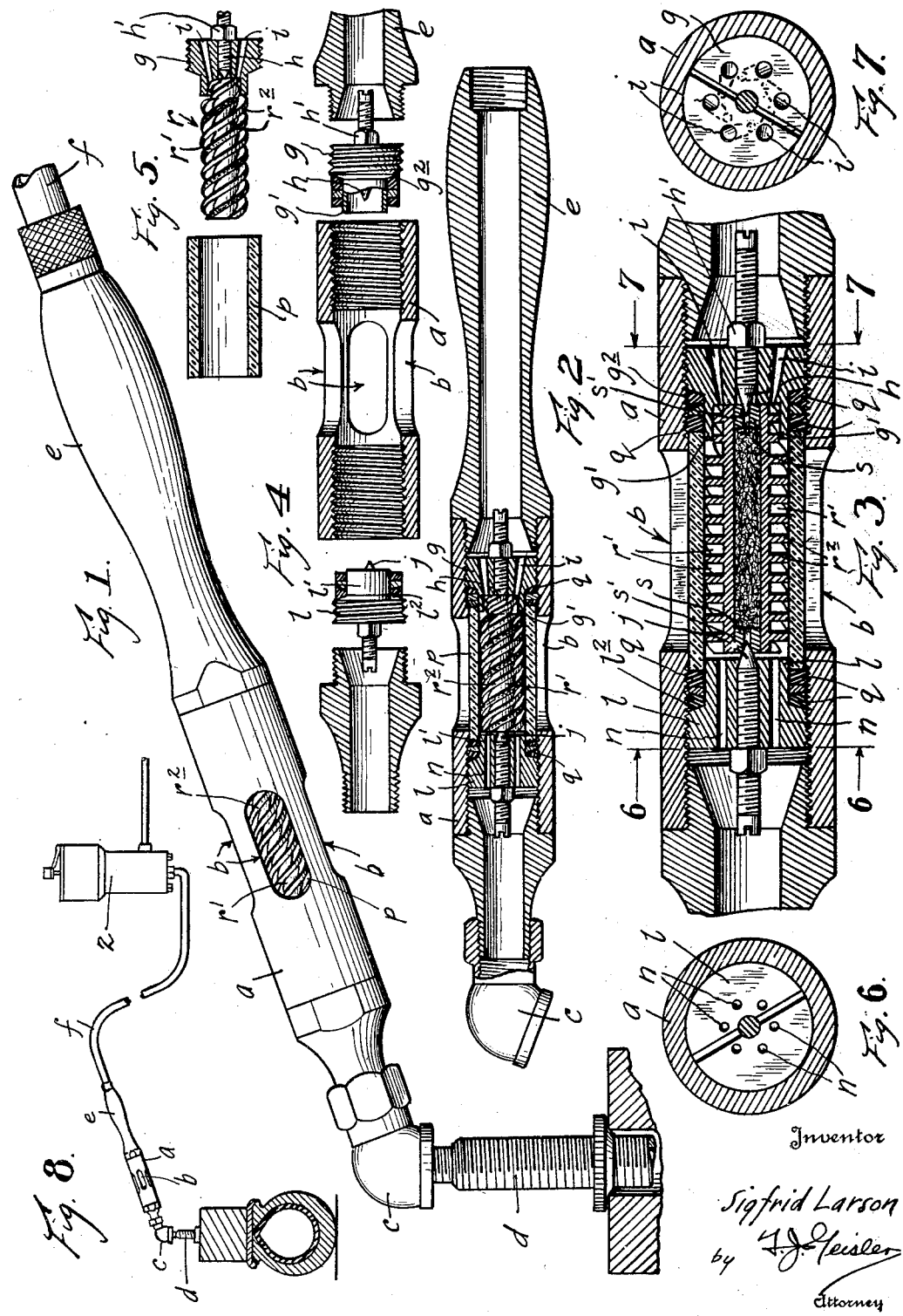
Inventor
Sigfrid Larson
by H. J. Heisler
Attorney Patented Mar. 10, 1931

1,795,340

UNITED STATES PATENT OFFICE

SIGFRID LARSON, OF PORTLAND, OREGON

FLOW INDICATOR FOR FLUIDS IN CLOSED CONDUITS

Application filed February 19, 1930. Serial No. 429,592.

My invention relates to devices for positively indicating the flow of a fluid through a conduit or the like.

Heretofore, no satisfactory means have, within my knowledge, been provided for indicating the flow of a fluid through a closed conduit. Also, when pneumatic automobile tires are to be inflated to a predetermined pressure, for which the tire is especially constructed, various devices are now provided, adapted to be set to automatically shut off the flow of compressed air when the required pressure in the tire has been reached. But with these devices no means have been provided for indicating when the flow of compressed air into the tire has stopped and hence when the tire has been properly inflated.

The principal object of my invention, therefore, is to provide a simple and dependable flow indicator adapted to be arranged in a conduit or pipe line directly in the path of the fluid and to be positively actuated thereby, so that the cessation of the flow of the fluid will be correspondingly indicated by the inactivity of the indicating elements of the device.

A further and more particular object of my invention is to provide a flow indicator adapted to be placed in an air hose adapted for the inflating of pneumatic automobile tires and located adjacent the nozzle of the same, whereby the flow of compressed air into the tire will be positively indicated to the attendant by the activity of the indicating elements of the flow indicator, and the cessation of the flow, when the tire has been brought to the pressure set by the regulating device, will also be positively indicated by the inactivity of the said indicating elements.

A further object of my invention is to provide a flow indicator adapted to be constructed as unit with the air hose nozzle, whereby the flow indicator will be placed conveniently for observation by the operator and at the same time form a handle for applying the said nozzle to the tire valve.

I attain my objects by providing the air hose with a nozzle having a visible member driven by the rush of air through the hose, whereby the rotation of said member indicates that the inflation of the tire is taking place; and when the tire is fully inflated to a given pressure, the equilibrium so established will cause further rotation of said indicating member to cease; thus indicating that the tire has been fully inflated.

These and other incidental features of my invention, the objects and details of construction and operation are hereinafter more fully described in the accompanying drawings.

In the drawings:

Fig. 1 shows a side elevation of my flow indicator, adapted to be used when a pneumatic tire is to be inflated;

Fig. 2 shows a central longitudinal section of my flow indicator and illustrates the details of construction;

Fig. 3 shows a fragmentary, enlarged section similar to that shown in Fig. 2, and further illustrates the details of construction;

Fig. 4 shows a section taken similarly to Fig. 3 with the parts removed but arranged in a relative order of assembly;

Fig. 5 shows the rotary indicating element and its transparent housing removed from the device; the housing being illustrated in longitudinal section;

Figs. 6 and 7 show transverse sections taken respectively on the lines 6—6, 7—7 of Fig. 3; and Fig. 8 shows more or less diagrammatically the relative arrangements of my flow indicator in a tire inflating, compressed air line.

Referring now to the figures, my flow indicator comprises a tubular housing $a$, provided with elongate observation ports or openings $b$, in its walls. To each end of the housing $a$ are threaded, respectively, a standard tire valve nozzle $c$, adapted for being attached to the well known tire valve $d$, as shown in Fig. 1, and a hollow handle member $e$, to which the air hose is to be connected, the latter connected with a source of compressed air not shown.

Plugs $g$ and $l$ are internally threaded into the inlet and outlet ends of the housing $a$, respectively. The plug $g$ is provided with a central threaded bearing pin $h$, and a hollow cylindrical extension $g'$ of lesser diameter than the plug itself. Concentrically arranged ducts $i$ are also provided leading through the said plug $g$, which are spiral and converge inwardly so as to open into the interior of the hollow extension $g'$, see Figures 3 and 7.

The plug $l$, threaded into the outlet end of the housing, is somewhat similar to the plug $g$ and is provided with a central threaded bearing pin $j$, and an inner extension $l'$, of less diameter, which, however, is not hollow. Concentrically arranged ducts $n$ are provided in the said extension $l'$, but which are formed parallel with the longitudinal axis thereof, and extend through the said extension.

A tubular, transparent section $p$, preferably of gage glass or the like, is arranged between the said plugs $g$, $l$, within the tubular housing $a$. The shoulders $g^2$, $l^2$ formed on the plugs $g$, $l$, by the extensions $g'$, $l'$ respectively, are beveled and bear against the respective ends of the transparent section $p$, and are provided with suitable packing $q$ to seal this bearing surface and prevent the escape of compressed air through the observation ports $b$.

A rotary spinner $r$, having spiral grooves $r'$ forming ribs $r^2$ between, is arranged within the glass section $p$, and journaled at its ends on the said bearing pins $g'$, $l'$. The spinner $r$ is hollow, see Fig. 3, and is provided in each end with bearing plugs $s$, having conical recesses $s'$ in their exterior surfaces, in which the conical ends of the said bearing pins $g'$, $l'$ bear, respectively. The conical recesses $s'$ communicate with the interior of the spinner and wool yarn, or the like, having a proportion of natural oil, is arranged therein with the yarn threads extending into each recess $s'$ to serve as lubricating means for the said bearing pins $g'$, $l'$. The ribs $r^2$ adjacent the plug $g$, see Figs. 3 and 5, are reduced in height to adapt the end of the member to be seated in said hollow extension.

Lock nuts $h'$, $j'$ are pivoted on the said bearing pins $h$, $j$, exterior of the plugs for maintaining the adjustment of the latter relative to member $v$.

By this construction, the streams of compressed air passing through the ducts $i$ are conducted in a spiral path into the said spiral grooves $r'$ substantially without change of direction, whereby there is practically no resistance to its flow. Furthermore, by seating the adjacent end of the member $r$ in the hollow extension $g'$, the compressed air is guided and forced to enter the grooves $r'$ and rotate the spinner $r$, and is prevented from escaping about the end of the said spinner.

In operation, when my flow indicator is to be used in connection with the equipment for inflating pneumatic automobile tires, see Figs. 1 and 8, the operator applies the nozzle $c$ to the tire valve $d$ in the usual manner and sets the pressure regulating device, shown diagrammatically in Fig. 8 at 2, to shut off at the predetermined pressure. The compressed air then flows into and through the tubular housing $a$ and rotates the spinner $r$. Such rotation will be noticeable through the observation ports $b$, which are further facilitated by the painting of the ribs $r^2$ in alternate colors and preferably with a phosphorescent paint. When the pressure in the tire has reached the point set at the regulating device, the flow of air will shut off and will be positively indicated by the inactivity of the spinner $r$ to inform the operator that the tire is properly inflated.

My invention, when used for other purposes, will of course, be similar in operation and cannot fail to indicate the flow of the fluid, since the latter cannot pass through the housing $a$ without rotating the spinner $r$, and failure of the flow will be positively indicated by the inactivity of the said spinner.

I claim:

1. In means for indicating the flow of fluid under pressure, a tubular section provided with a transparent wall portion, a plug inserted into each end of said tubular section, the plugs provided with ports communicating with the interior of the tubular section, a spinner revolubly mounted relative to said transparent wall portion, such spinner adapted to be actuated by the fluid passing through said tubular section, whereby to indicate the flow of the fluid, the plug inserted at the intake end of the tubular section being provided with an axial chamber, the adjacent end of the spinner being inserted in said chamber, the walls of said chamber being arranged to guide the fluid against, and thus actuate the spinner.

2. In means for indicating the flow of fluid under pressure, a tubular section provided with a transparent wall portion, plugs inserted in each of the opposite ends of the tubular section, conical bearings provided in said plugs, a spiral spinner rotatably supported by said bearings, the plugs provided with ports communicating with the interior of the tubular section, the plug inserted at the intake end of the tubular section being provided with guides adapted to direct the fluid against, and thus actuate the spinner.

3. In means for indicating the flow of fluid under pressure, a tubular section provided with a transparent wall portion, plugs inserted in each of the opposite ends of the tubular section, conical bearings provided in said plugs, a spiral spinner rotatably supported by said bearings, the plugs provided with ports communicating with the interior of the tubular section, the plug inserted at the intake end of the tubular section being provided with an axial chamber, the adjacent end of the spinner being inserted in said chamber, the walls of said chamber being arranged to guide the fluid against, and thus actuate the spinner.

4. In means for indicating the flow of fluid under pressure, a tubular section having an opening in one wall, an inner transparent tube inserted in said tubular section relative to said opening, plugs inserted in the opposite ends of the tubular section, and cooperating means securing said inner tube in place fluid tight between said plugs, a plug inserted into each end of said tubular section, the plugs provided with ports communicating with the interior of the tubular section, a spiral spinner journaled between said plugs, the plug inserted at the intake end of the tubular section provided with guides adapted to direct the fluid against, and thus actuate the spinner.

5. In means for indicating the flow of fluid under pressure, a tubular section having an opening in one wall, an inner transparent tube inserted in said tubular section relative to said opening, plugs inserted in the opposite ends of the tubular section, and cooperating means securing said inner tube in place fluid tight between said plugs, a plug inserted into each end of said tubular section, the plugs provided with ports communicating with the interior of the tubular section, the plug inserted at the intake end of the tubular section being provided with an axial chamber, the adjacent end of the spinner being inserted in said chamber, the walls of said chamber being arranged to guide the fluid against, and thus actuate the spinner.

6. In means for indicating the flow of fluid under pressure, a tubular section provided with a transparent wall portion, a spinner revolubly mounted relative to said transparent wall portion, such spinner adapted to be actuated by the fluid passing through said tubular section, whereby to indicate the flow of the fluid, a nozzle secured to one end of said tubular section, a fluid delivering element connected to the opposite end of the tubular section.

7. In combination with a hose, a hollow handle terminating in a nozzle to which handle the hose is attached, the handle provided with a transparent wall portion, a spinner revolubly mounted under said transparent wall portion, said spinner actuated by the fluid under pressure passing through the hose, whereby to indicate the flow and ceasing of the flow of the fluid.

8. In combination with means for delivering fluid pressure, means for indicating the flow of the fluid, comprising a tubular section provided with a transparent wall portion, plugs inserted in each of the opposite ends of the tubular section, conical bearings provided in said plugs, a spiral spinner rotatably supported by said bearings, the plugs provided with ports communicating with the interior of the tubular section, the plug inserted at the intake end of the tubular section being provided with guides adapted to direct the fluid against, and thus actuate the spinner, the spinner provided with a longitudinal bore, into which said conical bearings project, said bore filled with a lubricant holding material.

SIGFRID LARSON.